United States Patent
Nagarajaiah

[11] Patent Number: 6,098,969
[45] Date of Patent: Aug. 8, 2000

[54] STRUCTURAL VIBRATION DAMPER WITH CONTINUOUSLY VARIABLE STIFFNESS

[76] Inventor: Satish Nagarajaiah, Dept. of Civil Engineering, Mail Stop 318, Rice University, 6100 Main St., Houston, Tex. 77005

[21] Appl. No.: 09/135,370

[22] Filed: Aug. 17, 1998

[51] Int. Cl.[7] .................................................. F16M 1/00
[52] U.S. Cl. ............................... 267/136; 248/550; 52/1; 52/167.1; 52/167.4
[58] Field of Search ..................... 267/136, 134; 188/271; 52/1, 167.1, 167.4, 167.2; 248/638, 550

[56] References Cited

U.S. PATENT DOCUMENTS

| | | | |
|---|---|---|---|
| 4,736,931 | 4/1988 | Christipherson | 267/34 |
| 4,799,339 | 1/1989 | Kobori et al. | |
| 4,964,246 | 10/1990 | Kobori et al. | |
| 5,025,599 | 6/1991 | Ishii et al. | 52/167 DF |
| 5,036,633 | 8/1991 | Kobori et al. | |
| 5,065,552 | 11/1991 | Kobori et al. | |
| 5,107,634 | 4/1992 | Onoda et al. | |
| 5,147,018 | 9/1992 | Kobori et al. | |
| 5,410,845 | 5/1995 | Sakamoto et al. | 52/167.2 |
| 5,595,372 | 1/1997 | Patten | |
| 5,727,663 | 3/1998 | Taylor | 188/378 |
| 5,765,313 | 6/1998 | Lee et al. | |
| 5,820,114 | 10/1998 | Tsai | 267/202 |

*Primary Examiner*—Robert J. Oberleitner
*Assistant Examiner*—Lan Nguyen
*Attorney, Agent, or Firm*—John V. Stewart

[57] ABSTRACT

A semi-active variable stiffness control (SAIVS) device, which can change its stiffness continuously and smoothly between a maximum and minimum stiffness. It comprises four spring and telescoping tube elements arranged in a rhombus configuration with pivot joints at the vertices. A control rod powered by a DC servomotor reconfigures the aspect ratio of the rhombus under computer control. This aspect ratio determines the stiffness of the device, and is continuously variable using little power. The SAIVS is installed as a connection between structural elements, and varies the connection stiffness smoothly by changing its configuration in response to a control algorithm in the computer. The algorithm obtains accelerometer and displacement input as feedback to optimize the result. Thus it maintains the structure in a non-resonant vibration state under dynamic disturbances such as earthquakes and windstorms.

6 Claims, 9 Drawing Sheets

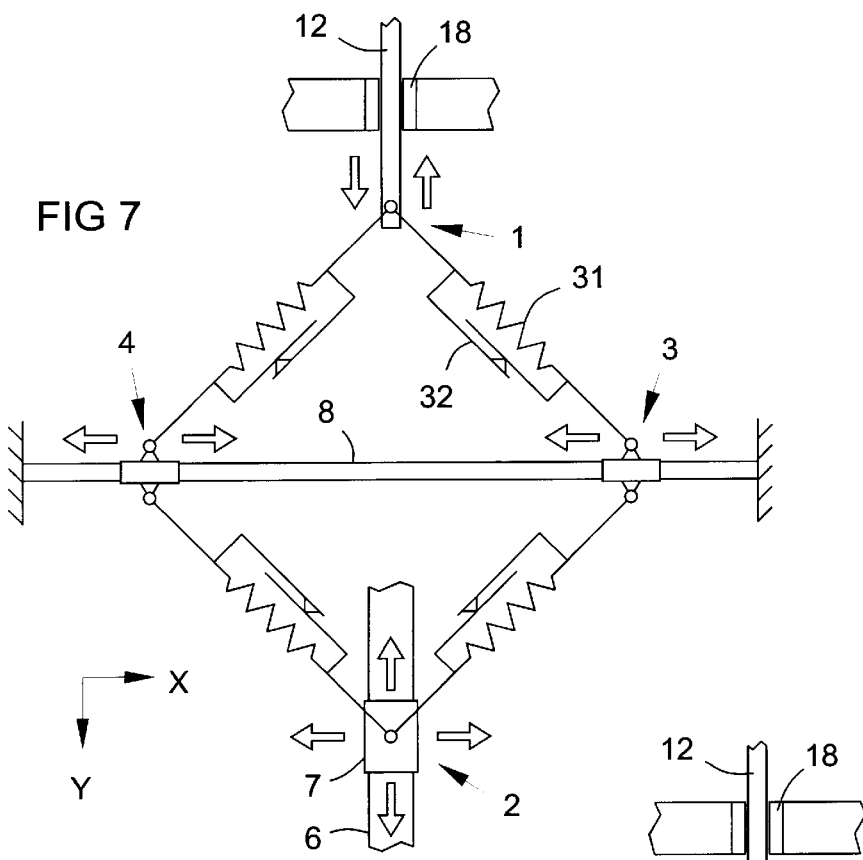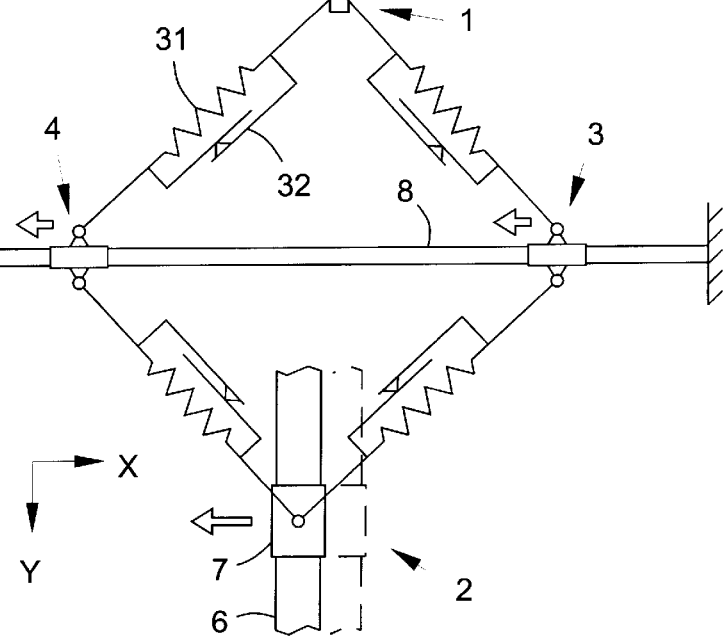

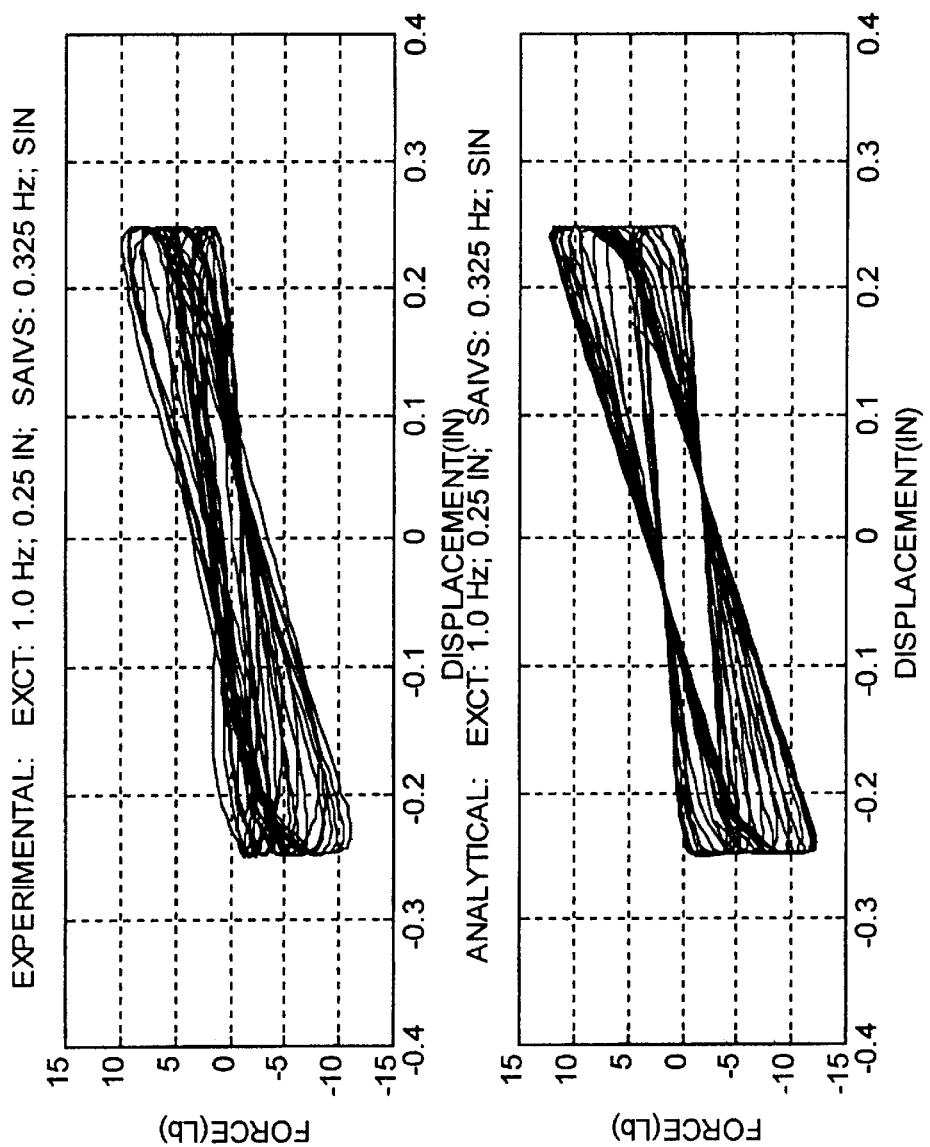

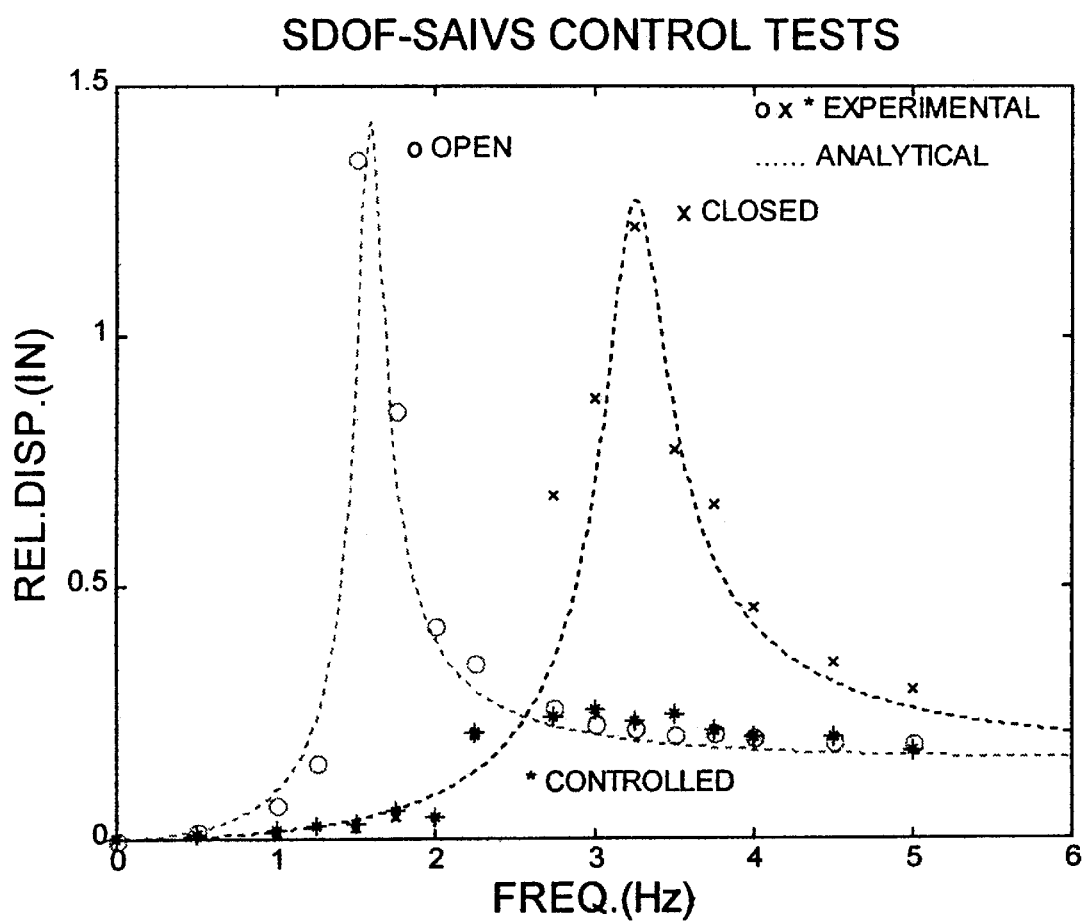

STRUCTURAL VIBRATION DAMPER WITH CONTINUOUSLY VARIABLE STIFFNESS

BACKGROUND OF THE INVENTION

1. Field of the Invention

This invention is in the field of mechanical vibration damping devices, especially those for damping oscillations by varying the stiffness of structures or connections in buildings during earthquakes and wind storms.

2. Description of Prior Art

Active structural control systems require considerable power to generate control forces that are applied directly to the structure. In semi-active systems the control forces are developed by variation in stiffness of the system, and are not due to direct application of force to the structure; hence, these systems need minimal power to operate.

A variable stiffness device has been developed by Kobori et al. (U.S. Pat. No. 5,147,018). The device consists of a hydraulic cylinder with a double-ended rod and piston and a bypass which allows flow of oil from one side of the piston to the other. The bypass has a valve, which can be closed and opened by a control signal. When the valve is closed the device locks and when the valve is open the device is unlocked. Hence, the device is an on-off device and has only two states, either open or closed. Engaging and disengaging braces using the device varies the stiffness of the building. The main limitation of this device is that the stiffness is switched abruptly from the open to the closed state and vice versa. Patten (U.S. Pat. No. 5,595,372) has developed a similar device that can only vary stiffness abruptly and in a limited fashion.

SUMMARY OF THE INVENTION

The objective of the present invention is to provide a continuously variable stiffness control device, which effectively damps building vibrations, uses minimal power, is inexpensive to manufacture, and requires little maintenance.

These objective are achieved by a semi-active variable stiffness control (SAIVS) device, which can change its stiffness continuously and smoothly between a designed maximum and minimum stiffness. It comprises four spring and telescoping tube elements arranged in a rhombus configuration with pivot joints at the vertices. A control rod powered by a DC servomotor reconfigures the aspect ratio of the rhombus under computer control. This aspect ratio determines the stiffness of the device, and is continuously variable using little power. The SAIVS is installed as a connection between structural elements, and varies the connection stiffness smoothly by changing its configuration in response to a control algorithm in the computer. The algorithm obtains accelerometer and displacement input as feedback to optimize the result. Thus it maintains the structure in a non-resonant vibration state under dynamic disturbances such as earthquakes and windstorms.

BRIEF DESCRIPTION OF THE DRAWINGS

FIG. 7 is a schematic view of the device in a neutral position;

FIG. 8 is a schematic view of the device as distorted by oscillation;

FIG. 9 shows a force versus displacement plot comparing the experimental model to the analytical model under harmonic excitation of 1 Hz, 0.635 CM (0.25 in), using a sinusoidal stiffness control response;

FIG. 12 shows a graph of relative displacement versus frequency for both the analytical model (smooth curves) and experimental model (discrete points) in the controlled, fixed open, and fixed closed positions.

REFERENCE NUMERALS

Figure 1:
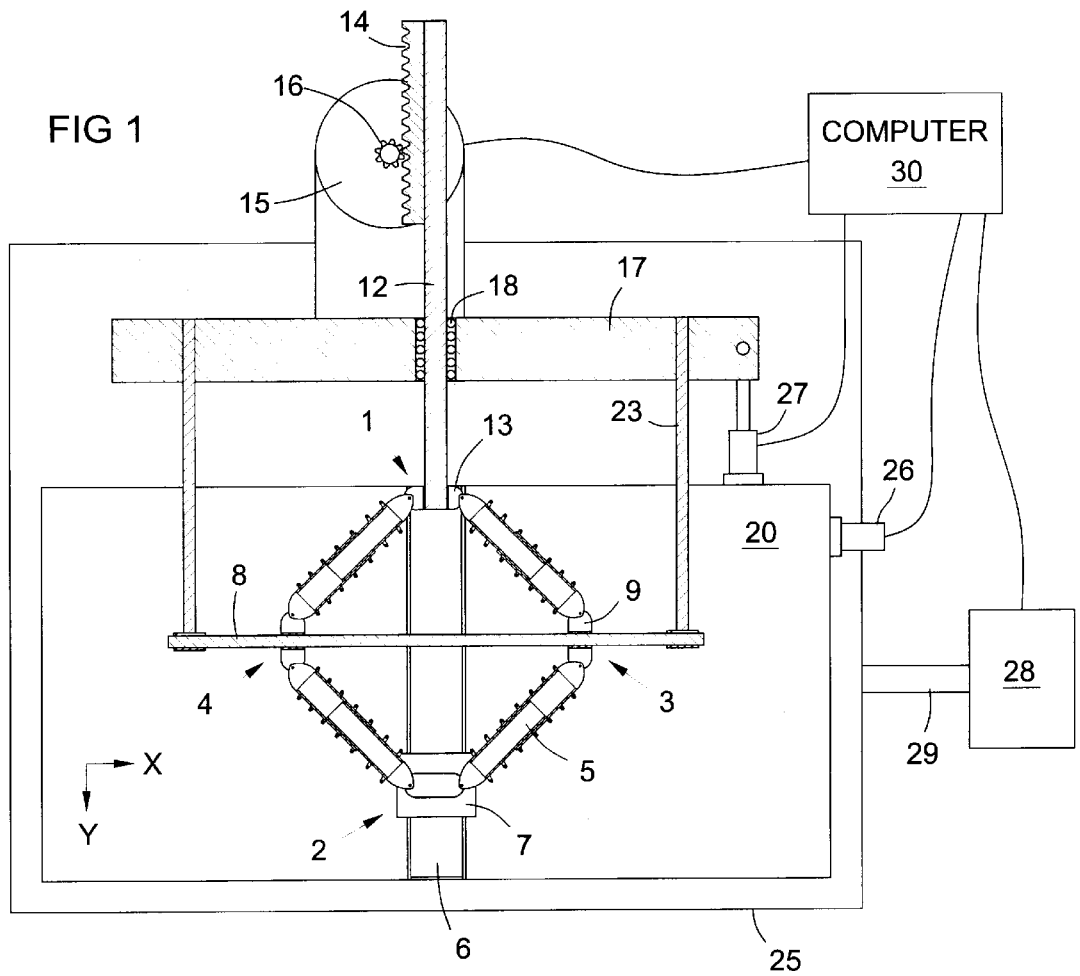
FIG. 1 is a top sectional view of the device in a single-degree-of-freedom single-floor building model, in a neutral position.

1. Joint #1
2. Joint #2
3. Joint #3
4. Joint #4
5. Stiffness and damping element
5A. Outer telescoping tube
5B. End plate of outer tube
5C. Spring retainer on outer tube
5D. Inner telescoping tube
5E. End plate on inner tube
5F. Spring retainer on inner tube
5G. Helical extension and compression spring
6. Rail
7. Carriage on rail, with pivotal attachment of two stiffness/damping elements
8. Fixed rod
9. Sliding sleeve with pivotal attachment of two stiffness/damping elements
12. Control rod
13. Pivotal attachment of two stiffness/damping elements to control rod
14. Linear gear rack on control rod
15. Control motor
16. Pinion gear on control motor
17. Bar fixed to bracing, or structural member 1
18. Bearing for control rod
20. Floor, or structural member 2
21. Floor support
23. Attachment strut between fixed rod and structural member 1
24. Bracing
25. Shake table
26. Accelerometer
27. Relative displacement gauge
28. Hydraulic actuator
29. Excitation rod from hydraulic actuator 30. Computer with input adapters for sensors such as an accelerometer (26) and
displacement gauge (27), and with controllers for a motor (15) and hydraulic
actuator (28);
31. Spring element in analytical model
32. Frictional damping element in analytical model

DESCRIPTION OF THE PREFERRED EMBODIMENTS

Figure 2:
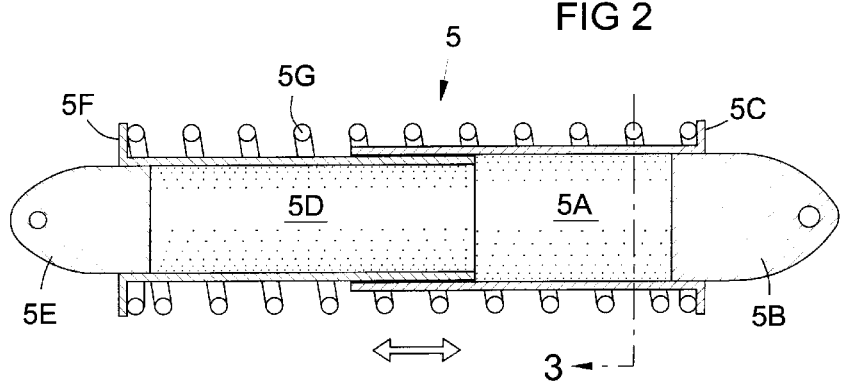
FIG. 2 is a top sectional view of a stiffness and damping element of the device.
Figure 3:
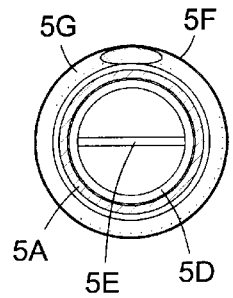
FIG. 3 is a cross sectional view of the stiffness and damping element taken along line 3 of FIG. 2.
Figure 4:
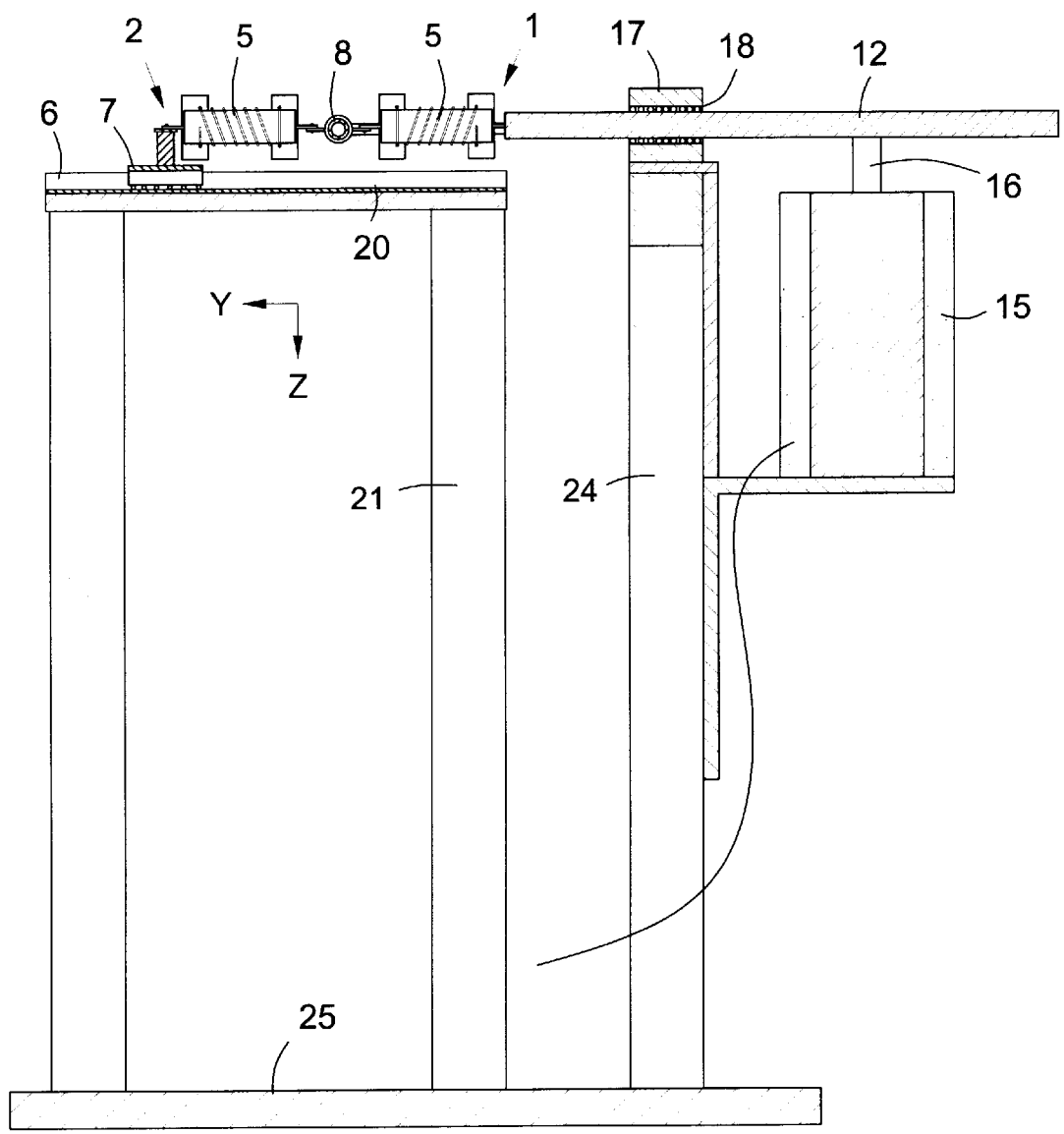
FIG. 4 is a side sectional view of FIG. 1 taken through the control rod (12)
Figure 5:
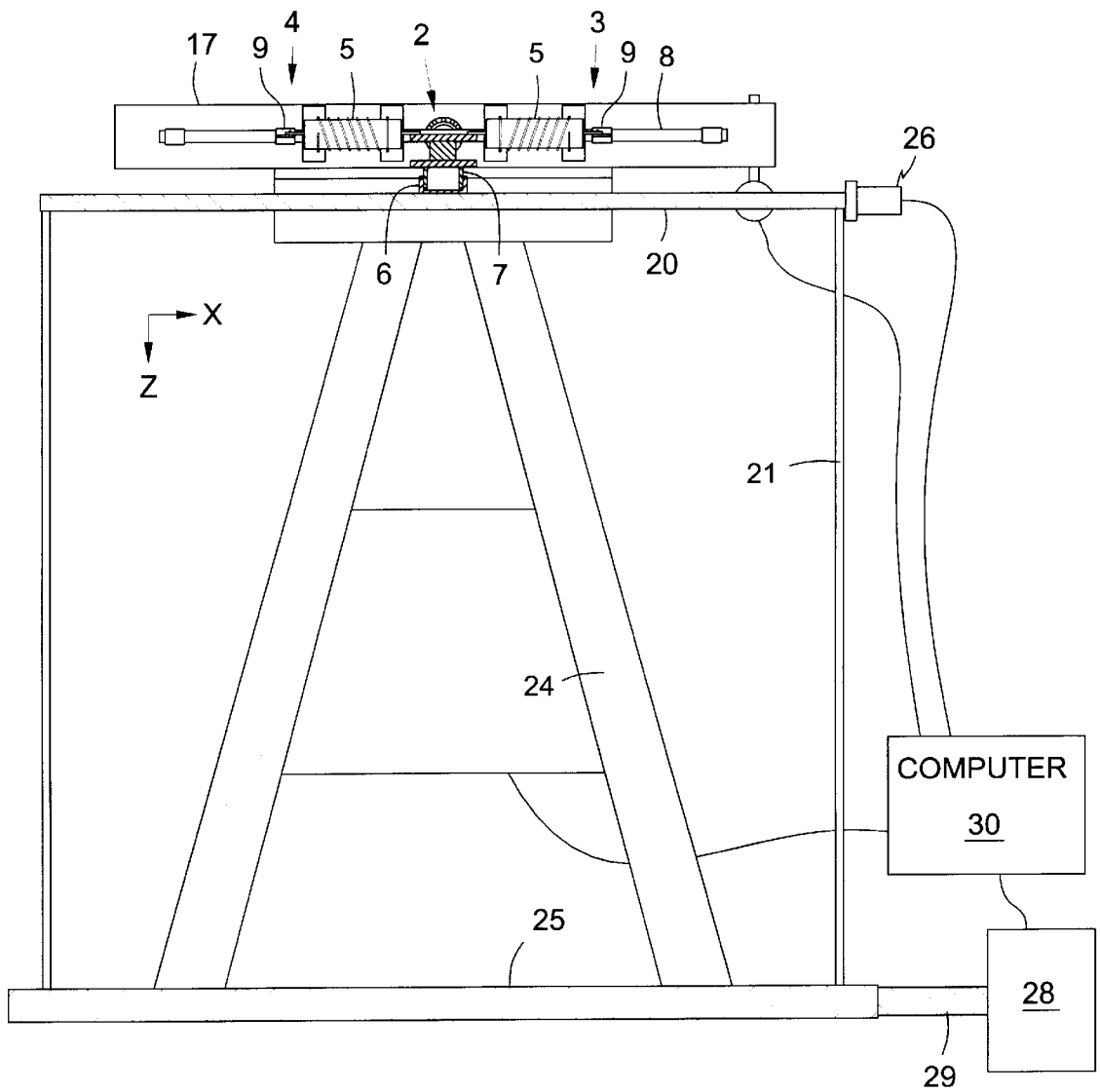
FIG. 5 is a front sectional view of FIG. 1 taken through the carriage (7)

As shown in FIGS. 1–8, the SAIVS device consists of four stiffness and damping elements (5) arranged in a rhombus configuration. The four vertices of the rhombus (14) have pivot joints for the ends of the stiffness/damping elements. As shown in FIG. 2, each of the four stiffness and damping elements (5) comprises a helical spring (5G) supported on the inside by telescoping tubes (5A, 5D). The tubes serve as a mandrel for the spring, and retain the spring at both ends (5C, 5F). The springs have no pre-load, and resist both extension and compression. The spring ends are retained for both directions of loading. The telescoping tubes guide the springs and prevent them from buckling. The tubes develop frictional forces that are beneficial in dissipating energy. The springs provide the stiffness component, and the telescoping tube friction provides the damping component of each stiffness and damping element. The tubes are not airtight, but are open at the ends. This design offers simplicity and low maintenance as compared to sealed fluid-damped tubes, and it provides effective damping through active tuning of the geometry. The use of other types of stiffness and damping elements is possible within the scope and spirit of the invention. With other types of elements, the resulting damping response curve may be different from the preferred version shown herein, but the continuous variability in stiffness will operate in the same manner.

In the single-floor building model shown, joint 1 of the device is attached to a control rod (12), which can move freely in the Y direction, but is restrained by a bearing (18) in the X direction. The bearing is housed in a square bar (17) fixed on top of a bracing system (24) shown in FIGS. 4 and 5. A DC servomotor (15) engages the control rod via a rack and pinion assembly (14, 16). The servomotor is controlled by a computer (30). Joint 2 is attached to a carriage (7) that rides on a rail (6) attached to the floor (20) of the building model. Joint 2 is free to move in the Y direction and constrained to displace with the floor in the X direction. Joints 3 and 4 are attached to sleeves (9), which slide on a fixed rod (8) in the X direction but cannot move in the Y direction. These sleeves develop frictional forces, but are otherwise unconstrained in the X direction. The fixed rod is attached to the square bar on the bracing system via connecting struts (23).

The device offers little resistance to a force applied to joint 1 in the Y direction. This is the key feature of the device. This feature is used to modify the aspect ratio of the rhombus continuously and smoothly by positioning joint 1 using the DC servomotor and controller. The device does not move in the Z direction.

Figure 6:
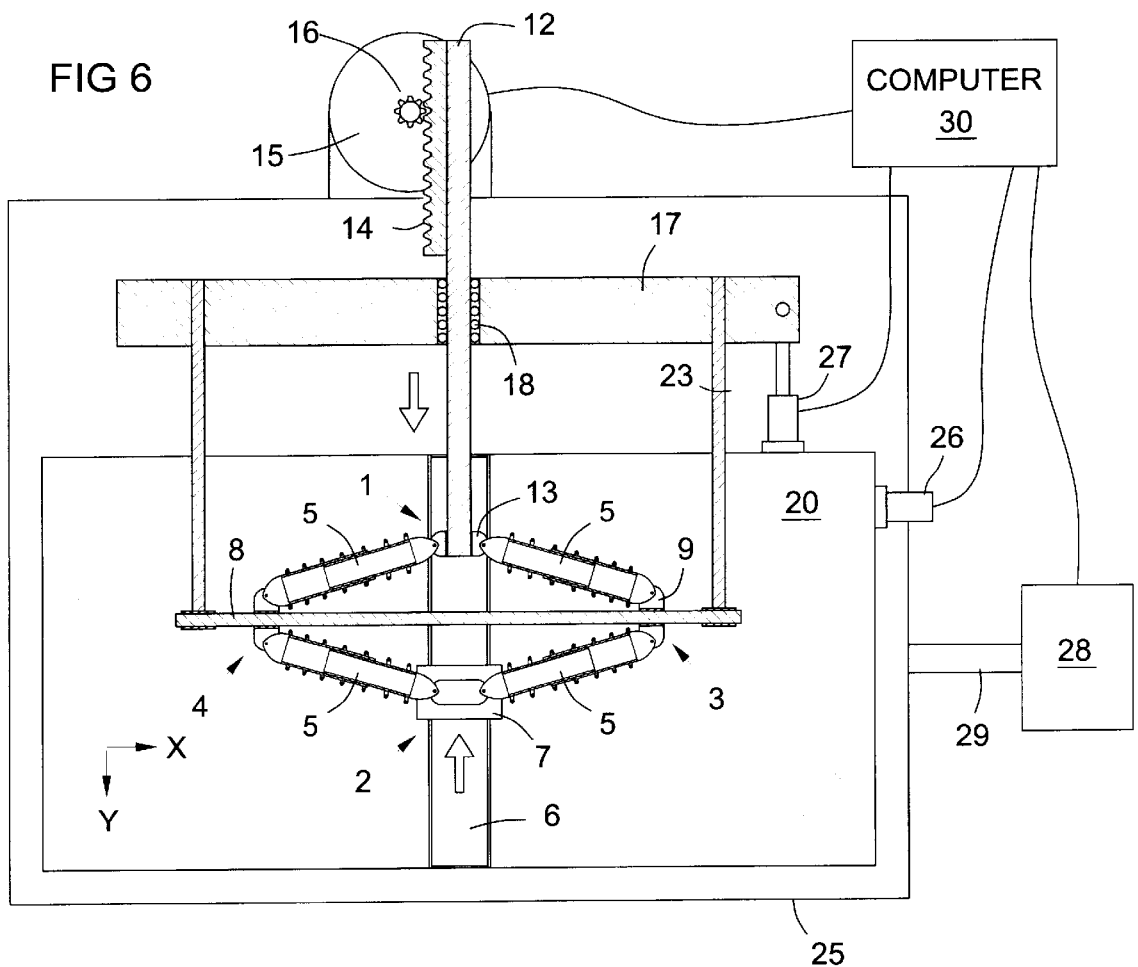
FIG. 6 is a top sectional view of FIG. 1 adjusted to a stiff configuration.

FIG. 6 shows the rhombus flattened in the Y direction, which provides maximum stiffness. This is defined as the closed position, and occurs when the control rod (12) has moved toward the center of the rhombus, causing joints 3 and 4 to slide apart. When the rhombus is flattened in the X direction, the device has minimum stiffness. This is defined as the open position, and occurs when the control rod moves away from the center of the rhombus. The geometry of the rhombus is continuously variable between the closed and open positions, resulting in continuously variable stiffness. The power required by the DC servomotor to position the device is minimal. Hence, the device is semi-active.

In a framed building structure, the SAIVS device is designed to connect the floor beam and inverted V bracing system (or any two main lateral force resisting systems such as truss members, struts, beams, bracing, columns, and shear-walls), and transfer forces between them. The SAIVS device acts as the connection between two such structural members, and the connection stiffness can be varied continuously and smoothly.

Preferably, an adaptive control algorithm in the computer determines the stiffness setting. This algorithm receives input from sensors such as accelerometers on one or both structural members, a displacement gauge that measures the relative displacement between the two structural members, and a force gauge that measures the force in the X direction on the bearing (18) or elsewhere. These sensors are interfaced to the computer to provide digitized measurements of the motion and position of the connected structures. The algorithm determines an optimum stiffness of the SAIVS device to minimize oscillations between the two structural members, and causes appropriate control signals to be sent to the motor. The algorithm can use any of several possible approaches for determining the optimum stiffness. For example, a table lookup method can be used which locates the current conditions in a table of experimentally and/or analytically tested conditions. Optimum control settings that have been verified or predicted for each respective condition are provided in the table. Alternately, the control algorithm can use computational approaches, ranging from a simple decision and feedback iteration loop to mathematical models of the structure which analyze current conditions and predict the optimum settings. The system designer makes a choice as to the sophistication of the algorithm and the associated expense of the computer and software.

A series of dynamic tests were conducted on the SAIVS device and single-degree-of-freedom (SDOF) floor model as shown. These tests were performed with harmonic excitation provided by a servo-hydraulic actuator (28). A force transducer on the end of the hydraulic excitation rod measured the forces applied by the actuator. Other sensors included a displacement gauge (27), an absolute accelerometer on the floor of the model, and a position gauge on the control rod (12) of the SAIVS device. A mathematical computer model was also developed and tested for comparison and calibration with the experimental model.

Figure 10:
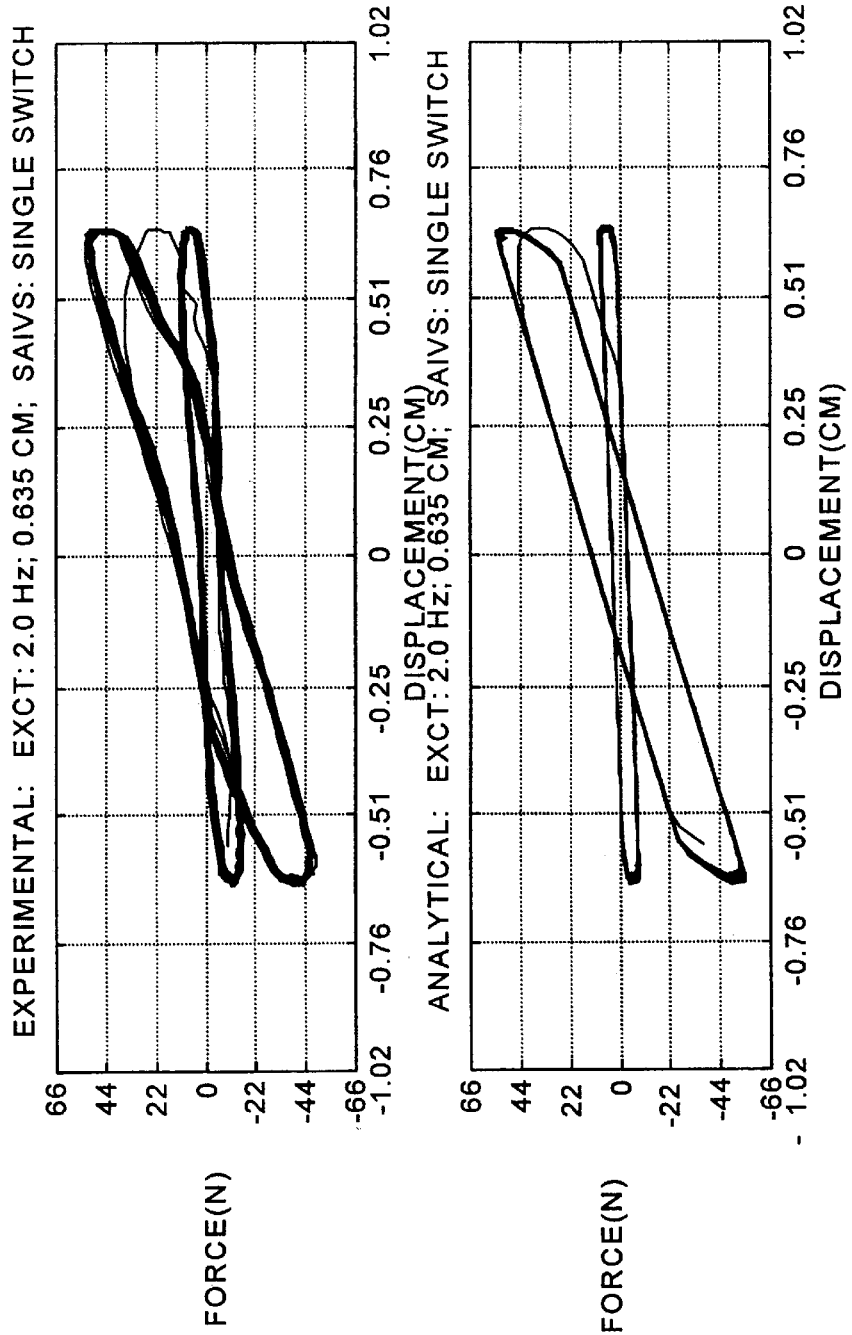
FIG. 10 shows a force versus displacement plot comparing the experimental model to the analytical model under harmonic excitation of 2 Hz, 0.635 CM (0.25 in), using a single switch stiffness control response.

The actuator was first attached to the floor (20) of the model for a series of SAIVS device tests, and then attached to the shake table (25) as shown herein, for a series of SDOF-SAIVS model tests. The stiffness of the individual springs used in these tests was 39 lb./inch. In the device tests, the displacement and force gauges were used to generate force/displacement curves. Examples of the force/displacement curves generated in both the device tests and mathematical model are shown in FIGS. 9 and 10 for given excitation conditions.

Figure 11:
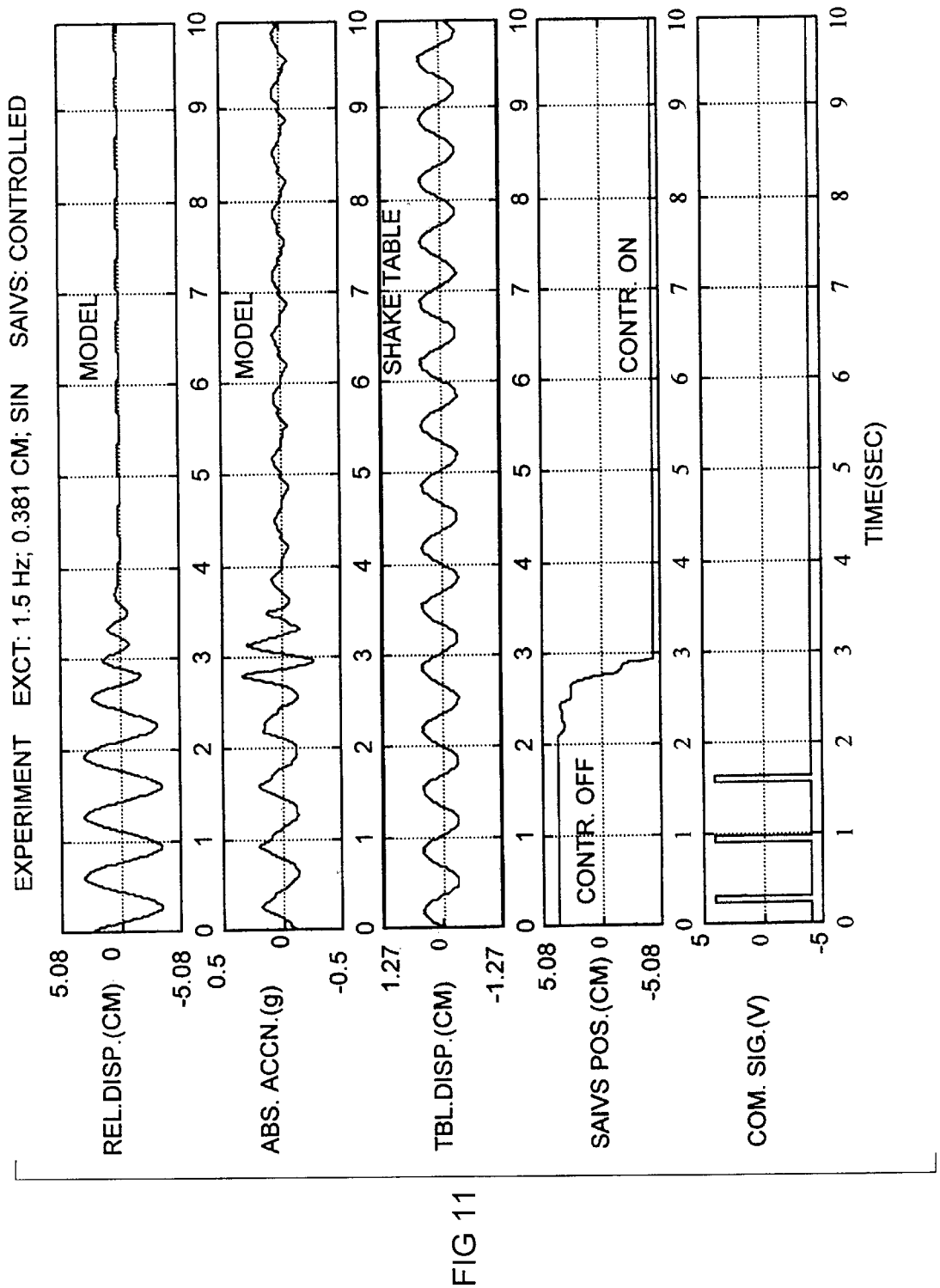
FIG. 11 shows a time history of a controlled response of the single degree of freedom (SDOF) experimental building model under harmonic excitation of 1.5 Hz, 0.381 CM, before and after the controller is activated.

The SDOF-SAIVS experimental model tests involved different frequencies and amplitudes of harmonic excitation imposed by the actuator, and different frequencies and switching positions of the SAIVS device implemented by the motor and computer. The test results were recorded as time histories of the sensors attached to the model. FIG. 11 is an example of the charts produced in these tests. They show the model response to a given excitation condition, under control of a basic table lookup version of the adaptive control algorithm. FIG. 12 shows a graph of the relative displacement versus frequency for both the analytical model (smooth curves) and experimental model (discrete points).

The minimum stiffness of the tested SAIVS device in the open position is 7 lb./inch and the maximum stiffness in the closed position is 38 lb./inch. Neither this range nor its ratio is suggested as a limitation, but is only mentioned for understanding the behavior of the experimental model as tested. The hysteretic behavior due to friction in the telescoping tubes and other connections is seen in the force-displacement loops of FIGS. 9 and 10. The loops are stable and repeatable. It is evident from FIG. 9 that the device can vary the stiffness continuously and smoothly, and that the analytical model captures the behavior of the device satisfactorily. It is evident from FIG. 10 that a single switch of the device from the closed to open position occurs smoothly.

In applying the device to buildings, the engineer selects structure designs and placements of SAIVS connections according to engineering principles and options. For example, one or more SAIVS devices may be used on each side of each floor of a building. All of the SAIVS devices on parallel sides of a given floor may be electronically coordinated and synchronized with each other, although this is not necessary. A single computer using a mathematical model of the floor or building, with sensor input from all SAIVS units covered, may control the whole system of SAIVS devices on a floor, or in a whole building.

Additional details of the test results and control algorithm can be found in the published proceedings of the Inventor's presentation at the Second World Conference on Structural Control, held in Kyoto Japan in July 1998.

Diverse applications in other fields are possible. For example, SAIVS devices could serve as motor vehicle suspension shock absorbers. In this application, the suspension stiffness could be varied as a function of vehicle load, as well as responding to harmonic or other oscillations of the wheels. This could be especially useful for vehicles, such as mining trucks, that haul heavy loads of material over unpaved roads.

Although the present invention has been described herein with respect to preferred embodiments, it will be understood that the foregoing description is intended to be illustrative, not restrictive. Modifications of the present invention will occur to those skilled in the art. All such modifications which fall within the scope of the appended claims are intended to be within the scope and spirit of the present invention.

I claim:

1. A vibration damper connecting structural members and controlling the stiffness of the connection, comprising:

four stiffness and damping elements pivotally connected end-to-end to form a quadrilateral with four linearly extendable sides and four pivotally flexible apexes, the quadrilateral having first and second diagonals, each diagonal being a line between two opposite apexes of the quadrilateral and having first and second ends;

a control rod connected to the quadrilateral apex located at the first end of the first diagonal;

a first structural member;

a bearing on the first structural member that constrains the control rod to linear movement in substantial alignment with the first diagonal;

a carriage connected to the quadrilateral apex at the second end of the first diagonal;

a second structural member;

a rail attached to the second structural member parallel to the first diagonal;

the carriage mounted and retained on the rail for movement parallel to the first diagonal;

a fixed rod passing through the quadrilateral apex at each end of the second diagonal and attached to the first structural member;

a sleeve on the quadrilateral apex at each end of the second diagonal, each sleeve mounted and retained on the fixed rod for slidable movement thereon;

whereby linear movement of the control rod in the bearing changes the shape of the quadrilateral, thereby changing the stiffness of the connection between the first and second structural members.

2. The damping device of claim 1, wherein each of the stiffness and damping elements comprises a telescoping tube having two ends, and a helical spring having two ends, the spring mounted on the tube and retained at each end by the respective end of the tube.

3. The damping device of claim 1, further comprising:

a servo motor engaged with the control rod for linear positioning of the control rod;

a computer that is interfaced to the motor for control signaling thereto;

at least one sensor attached to the second structural member for measuring its motion, the sensor interfaced to the computer for digital input thereto;

an adaptive algorithm in the computer that analyzes the digitized sensor data and determines control signals to be sent to the motor.

4. A structural vibration damper with continuously variable stiffness, comprising: first and second structural members;

four telescoping stiffness and damping elements, each element having two ends;

the four stiffness and damping elements interconnected end-to-end in a rhombus configuration;

the rhombus having a plane, four apexes, a geometric center, and first and second diagonals, each diagonal being a line between two opposite apexes;

a first joint at one end of the first diagonal;

a second joint at the other end of the first diagonal;

a third joint at one end of the second diagonal;

a fourth joint at the other end of the second diagonal;

each joint pivotally retaining adjacent ends of an adjacent pair of the stiffness and damping elements in the rhombus, providing rotational freedom of the two damping elements in the pair relative to each other in the plane of the rhombus;

a bearing on the first structural member;

a control rod mounted in the bearing and connected to the first joint;

a motor engaging the control rod for moving the first joint toward and away from the center of the rhombus;

a rail attached to the second structural member parallel to the first diagonal;

a carriage mounted and retained on the rail for movement along the rail;

the second joint attached to the carriage;

the third and fourth joints each having a sleeve oriented with the second diagonal;

a guide rod passing through the sleeves for guiding the third and fourth joints slidably along the second diagonal;

the guide rod fixed to the first structural member;

whereby the first joint can be moved toward or away from the center of the rhombus to vary the shape of the rhombus, and thus vary the stiffness of the connection between the two structural members.

5. The damping device of claim 4, wherein each of the stiffness and damping elements comprises a telescoping tube having two ends, and a helical spring having two ends, the spring mounted on the tube and retained at each end by the respective end of the tube.

6. The damping device of claim 4, further comprising:

a computer that is interfaced to the motor for control signaling thereto;

an accelerometer attached to the second structural member and interfaced to the computer for input thereto;

a linear displacement gauge that measures the displacement of the second structural member relative to the first structural member, and is interfaced to the computer for input thereto;

an adaptive algorithm in the computer which analyzes the two inputs above in real time and determines control signals to be sent to the motor in response to oscillation of the second structural member.

\* \* \* \* \*